(12) United States Patent
Pennel et al.

(10) Patent No.: US 11,958,086 B2
(45) Date of Patent: Apr. 16, 2024

(54) CLEANING DEVICE WITH A REINFORCED GUIDE PROFILE

(71) Applicant: A X SYSTEM, Bailleul (FR)

(72) Inventors: Romain Pennel, Bailleul (FR); Jason Dehem, Bailleul (FR)

(73) Assignee: A X SYSTEM, Bailleul (FR)

( * ) Notice: Subject to any disclaimer, the term of this patent is extended or adjusted under 35 U.S.C. 154(b) by 0 days.

(21) Appl. No.: 17/841,857

(22) Filed: Jun. 16, 2022

(65) Prior Publication Data

US 2022/0401998 A1    Dec. 22, 2022

(30) Foreign Application Priority Data

Jun. 16, 2021  (FR) .................................. FR2106362

(51) Int. Cl.
*B08B 3/02*   (2006.01)
*B63B 59/06*  (2006.01)
*F28G 1/16*   (2006.01)
*B60S 3/00*   (2006.01)

(52) U.S. Cl.
CPC .............. *B08B 3/024* (2013.01); *B63B 59/06* (2013.01); *F28G 1/16* (2013.01); *F28G 1/166* (2013.01); *B60S 3/00* (2013.01)

(58) Field of Classification Search
CPC ......... F28G 1/166; B63B 59/06; B08B 3/024; B60S 3/00
See application file for complete search history.

(56) References Cited

U.S. PATENT DOCUMENTS 3,724,758 A * 4/1973 Fizmaurice .......... A01G 25/092
                                              239/254

FOREIGN PATENT DOCUMENTS

| CN | 106111572 A | * 11/2016 | ............. B08B 1/006 |
|----|-------------|-----------|----------|
| EP | 1604164 A1 | 12/2005 | |
| EP | 2034266 A2 | 3/2009 | |
| FR | 2955651 A1 | 7/2011 | |
| WO | 2017028959 A1 | 2/2017 | |

OTHER PUBLICATIONS

Preliminary Research Report with English translation dated Mar. 3, 2022, in corresponding French Application No. FR2106362; 18 pages.

* cited by examiner

*Primary Examiner* — Joseph L. Perrin
*Assistant Examiner* — Kevin G Lee
(74) *Attorney, Agent, or Firm* — Maier & Maier, PLLC (57) ABSTRACT

A device for cleaning surfaces, mobile, in particular for the cleaning of the cooling elements of an exchanger, including a truck for a nozzle-carrier rack, intended to be disposed in a movable manner facing the surface to be cleaned, carrying a nozzle-carrier rack, with one or more nozzles spraying the surface to be cleaned, and a guide system including, on the one hand, at least one guide profile on which the truck for a nozzle-carrier rack moves, acting as a path for the truck during its movement in the direction of the guide profile, and on the other hand, bearing members of the truck moving on the at least one profile, and wherein the at least one guide profile is rigidified by at least one rigidification beam, under elastic tension, rigidly connected in several discrete positions by fastening plates to the guide profile.

12 Claims, 11 Drawing Sheets

CLEANING DEVICE WITH A REINFORCED GUIDE PROFILE

The present disclosure relates to a device for cleaning surfaces, mobile, as well as a method for manufacturing such a cleaning device.

FIELD

In the industrial field, fluid/air (vapor/air, water/air) heat exchangers are routinely used to cool, or even to condense a fluid. Quite often, the fluid to be cooled circulates in cooling tubes, the outside of the tubes being provided with fins in order to increase the surface of exchange with the air.

With time, a fouling of the tubes at its interface with the air and more particularly a fouling at the interspaces between said fins, zones particularly difficult to clean, is however noted. This fouling deteriorates the performance of the heat exchanger and it is recommended to periodically clean the cooling tubes.

BACKGROUND

For this purpose, various cleaning devices designed for this use are known from the prior art. For example from the document EP-1 604 164, a device is known that comprises a truck for a nozzle-carrier rack disposed in a movable manner in the longitudinal direction of the cooling tubes of heat exchangers. This truck is equipped with a nozzle-carrier rack with several spray nozzles. During its use, the nozzle-carrier rack sprays a pressurized cleaning fluid onto the cooling tubes, the rack being moved during the cleaning along the tubes. This truck for a nozzle-carrier rack is movable along a polygonal guide profile acting as a guide for the truck, suspended from the latter.

This device also comprises a second truck, called support truck, and movable in a direction orthogonal to the direction of the polygonal guide profile. This support truck comprises the polygonal profile as well as calipers provided with wheel and allows the movement of the support truck in a direction orthogonal to the direction of the polygonal profile. This support truck thus also supports the truck for a nozzle-carrier rack which is thus movable according to the two directions of the space in order for the nozzle-carrier rack to be able to sweep the entire surface of the exchanger to be cleaned.

In order to allow the actuation to movement of the truck for a nozzle-carrier rack, the support truck carries an electric motor as well as a flexible transmission, such as a belt, to move the truck for a nozzle-carrier rack along the polygonal guide profile. The supply of cleaning fluid to the truck for a nozzle-carrier rack is carried out using free, flexible pipes.

From the document FR 2 955 651 B1 from the present applicant a mobile device for cleaning surfaces is known, in particular for the cleaning of the cooling elements of an exchanger, which comprises, like the document EP-1 604 164:
- a truck for a nozzle-carrier rack, intended to be disposed in a movable manner facing the surface to be cleaned, carrying a nozzle-carrier rack, with at least one nozzle,
- a guide profile on which said truck for a nozzle-carrier rack moves, acting as a path for said truck during its movement in the direction of said guide profile,
- a flexible pipe for a cleaning fluid supplying said nozzle-carrier rack,
- motorization means and transmission means for actuating the truck for a nozzle-carrier rack to movement along the guide profile.

The document FR 2 955 651 B1 is notable in that:
- the flexible pipe is provided as internal at least at said guide profile, capable of sliding in said guide profile during the movement of said truck for a nozzle-carrier rack,
- said guide profile has a longitudinal opening facing said nozzle-carrier rack allowing the circulation of the cleaning fluid from said flexible pipe, internal to said guide profile, to said nozzle-carrier rack,
- said transmission means consist substantially of said flexible pipe which combines a function of pipe for a cleaning fluid and a function of transmission for the movement of said truck for a nozzle-carrier rack,
- said motorization means cooperate with said flexible pipe to push or on the contrary to pull said flexible pipe in the guide profile, and thus move the truck for a nozzle-carrier rack along said guide profile.

Whether it is the document EP-1 604 164 or FR 2 955 651 B1, during the cleaning, the guide profile acting as a guide for the truck for a nozzle-carrier rack, which can have a length typically greater than 10 meters, is placed along the surface of the exchanger which can be an inclined surface, or even a horizontal surface.

When the truck for a nozzle-carrier rack moves along the guide profile, this guide profile must be dimensioned as sufficiently resistant to limit the deformation of this profile under the weight of the truck for a nozzle-carrier rack and thus dimensioned to limit the deflection of the guide profile.

Limiting the deflection of the profile requires providing a guide profile having a significant cross-section, particularly costly, in particular for the solution according to FR 2 955 651 B1, the guide profile of which includes a longitudinal opening allowing the circulation of the cleaning fluid from said flexible pipe, internal to said guide profile, to said nozzle-carrier rack.

SUMMARY

The present disclosure improves the situation.

A device for cleaning surfaces is proposed, mobile, in particular for the cleaning of the cooling elements of an exchanger, comprising:
- a truck for a nozzle-carrier rack, intended to be disposed in a movable manner facing the surface to be cleaned, carrying a nozzle-carrier rack, with one or more nozzles spraying the surface to be cleaned,
- a guide system including, on the one hand, at least one guide profile on which said truck for a nozzle-carrier rack moves, acting as a path for said truck during its movement in the direction of said guide profile, and on the other hand, bearing members of the truck moving on said at least one guide profile,
- a flexible pipe for a cleaning fluid supplying said nozzle-carrier rack,
- motorization means and transmission means for actuating the truck for a nozzle-carrier rack to movement along the guide profile.

According to the present disclosure, said at least one guide profile includes a rigidification device including at least one rigidification beam extending along said at least one guide profile, above said guide profile when the direction of spraying of the nozzle(s) is directed downward, and wherein said at least one rigidification beam is fastened to the guide profile in several discrete positions along the guide profile by fastening plates, said fastening plates connecting said at least one rigidification beam to the guide profile, and wherein said at least one rigidification beam is a metal beam which is maintained curved under tension in the elastic zone of the metal beam by said fastening plates, configured so as to rigidify the guide profile.

The features disclosed in the following paragraphs can, optionally, be implemented. They can be implemented independently of each other or in combination with each other:

According to one embodiment, the fastening plates include:
- end plates, connecting a first end of said at least one rigidification beam to a first end of said at least one guide profile and connecting a second end of said at least one rigidification beam to a second end of said at least one guide profile,
- one or more intermediate plates, having a greater dimension than the end beams, the intermediate plates connecting said at least one rigidification beam to said at least one guide profile in one or more intermediate positions between the first ends and the second ends of the rigidification beam and of said at least one guide profile.

According to one embodiment, said cleaning device has several intermediate plates, including a central plate, arranged at mid-length of said at least one guide profile, and one or more intermediate plates positioned between said central plate and the end plates, in a symmetrical manner with respect to a plane perpendicular to said at least one guide profile passing through said central plate.

According to a first embodiment, said at least one guide profile includes a single guide profile, under elastic tension, and wherein said at least one rigidification beam includes a first rigidification beam and a second rigidification beam that are fastened to said guide profile by said fastening plates in said discrete positions, and curved in a symmetrical manner, in the elastic zone of the metal beams, with respect to a plane of symmetry passing through the axis of the guide profile.

According to this first embodiment, the fastening plates can be in a V, each, or at least in part, having a fastening base, rigidly connected to the guide profile, as well as a first lateral wing and a second lateral wing extending on either side in a manner symmetrical to the plane of symmetry, in an inclined manner with respect to the plane of symmetry and wherein:
- said first lateral wings of the various fastening plates are contained in the same first plane, ensuring the fastening of the first rigidification beam which is curved in a plane of curvature parallel to said first plane and
- said second lateral wings of the various fastening plates are contained in the same second plane, ensuring the fastening of the second rigidification beam which is curved in a plane of curvature parallel to said second plane.

The first inclination between the first plane and the plane of symmetry and the second inclination between the second plane and the plane of symmetry are identical in absolute value, typically between 10° and 80°, for example between 30° and 60° such as 45°.

All or a part of the fastening plates in a V can be made of one piece, namely the first and the second lateral wing form the same one-piece part. Some or even all or a part of the fastening plates can be made of two distinct parts to form the two lateral wings with a possibility of adjusting their spacing.

According to a second embodiment, said at least one guide profile includes two guide profiles, extending in parallel consisting of a first guide profile and a second guide profile, and wherein said at least one rigidification beam has a pair of rigidification beams including:
- a first rigidification beam, under elastic tension, which is fastened by a first series of said fastening plates to the first guide profile, curved in the elastic zone of the metal beam,
- a second rigidification beam, under elastic tension, which is fastened by a second series of said fastening plates to the second guide profile, curved in the elastic zone of the metal beam,
- and wherein a first set consisting of the first guide profile, the first rigidification beam and the fastening plates of the first series, on the one hand, and a second set consisting of the second guide profile, the second rigidification beam and the fastening plates of the second series, on the other hand, are maintained in a parallel manner and are spaced apart by a ladder including a first rail and a second rail, as well as bars connecting the first rail and the second rail and wherein the fastening plates of the first series are fastened to the first rail and the fastening plates of the second series are fastened to the second rail.

According to this second embodiment:
- the fastening plates of the first series belonging to the first set can be contained in a plane that is parallel to the plane of curvature of the first rigidification beam, the first rail and the first rigidification beam being fastened to said fastening plates of the first series on either side of the plane,
- the fastening plates of the second series belonging to the second set can be contained in a plane that is parallel to the plane of curvature of the first rigidification beam, the second rail and the second rigidification beam being fastened to said fastening plates of the second series on either side of the plane.

According to one embodiment, in particular the first or second embodiment, said at least one rigidification beam is curved in its elastic zone with a radius of curvature between 10000 mm and 13000 mm.

According to one embodiment, in particular the first or second embodiment,
- the flexible pipe is provided as internal at least at said guide profile, capable of sliding in said guide profile during the movement of said truck for a nozzle-carrier rack,
- said guide profile has a longitudinal opening facing said nozzle-carrier rack allowing the circulation of the cleaning fluid from said flexible pipe, internal to said guide profile, to said nozzle-carrier rack,
- said transmission means consist substantially of said flexible pipe which combines a function of pipe for a cleaning fluid and a function of transmission for the movement of said truck for a nozzle-carrier rack,
- said motorization means cooperate with said flexible pipe to push or on the contrary to pull said flexible pipe in the guide profile, and thus move the truck for a nozzle-carrier rack along said guide profile.

The present also relates to a method for manufacturing a cleaning device according to the present disclosure, wherein the rigidification of the guide system including said at least one guide profile is obtained by curving a rigidification beam, metal, preferably rectilinear in the non-stressed state, and up to a radius of curvature of the beam in the elastic zone of said metal beam, then fastening of the rigidification beam under tension at said radius of curvature to the guide profile 6 by the rigid connection of the fastening plates at said discrete positions along the guide profile.

BRIEF DESCRIPTION OF DRAWINGS

Other features, details and advantages will appear upon reading the following detailed description, and upon analyzing the appended drawings, in which:

FIG. 1 is a view of a cleaning device according to the prior art disclosed by the document FR 2 955 651 B1 which includes a truck for a nozzle-carrier rack, intended to be disposed in a movable manner facing the surface to be cleaned, carrying a nozzle-carrier rack, with at least one nozzle, a guide system including a guide profile on which said truck for a nozzle-carrier rack according to the prior art moves, acting as a path for said truck during its movement in the direction of said guide profile and a flexible pipe for a cleaning fluid supplying said nozzle-carrier rack provided as internal at least at said guide profile, capable of sliding in said guide profile during the movement of said truck for a nozzle-carrier rack, said guide profile has a longitudinal opening facing said nozzle-carrier rack allowing the circulation of the cleaning fluid from said flexible pipe, internal to said guide profile, to said nozzle-carrier rack, said transmission means consist substantially of said flexible pipe which combines a function of pipe for a cleaning fluid and a function of transmission for the movement of said truck for a nozzle-carrier rack and which is moved in the guide profile by a pusher device, disposed on the ground.

DETAILED DESCRIPTION

The drawings and the description below contain, in essence, elements of a certain nature. They can thus not only be used to make the present disclosure better understood, but also contribute to its definition, if necessary.

Figure 1:
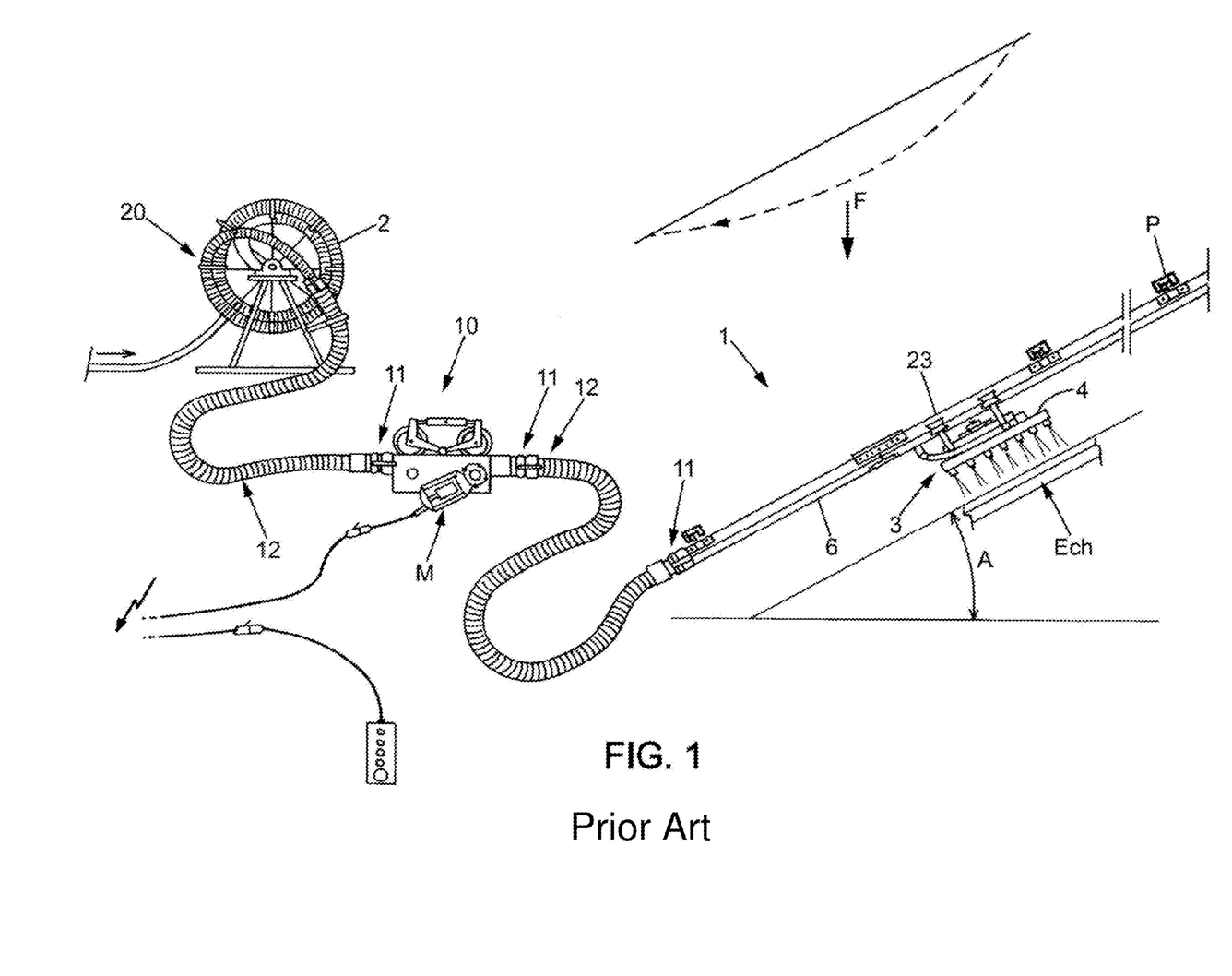
Figure 2:
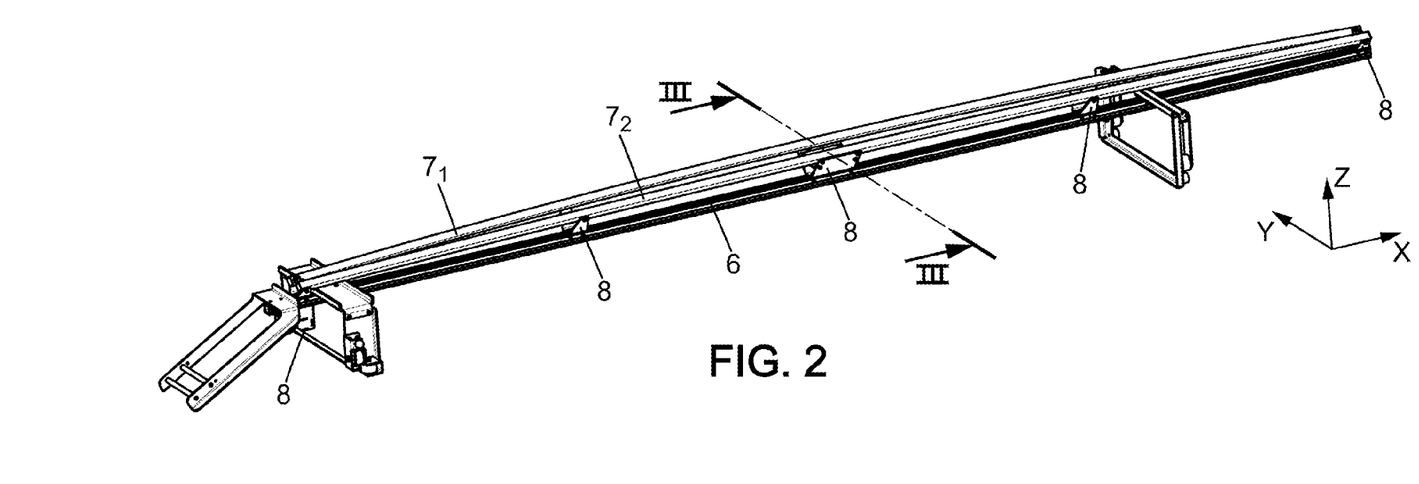
FIG. 2 is a perspective view of the guide profile of a guide system according to a first embodiment of the present disclosure which can be provided in replacement of that illustrated in FIG. 1, and which includes a pair of rigidification beams, curved and under elastic tension, linked at several discrete position along the guide profile by fastening plates.

Reference is now made to FIG. 1.

FIG. 1 illustrates a cleaning device according to FR 2 955 651 B1 which includes a guide profile 6 along which a truck 3 for a nozzle-carrier rack can slide. The nozzle-carrier rack 4 is supplied with cleaning fluid by a pipe 2, internal to the guide profile 6, supplying the nozzles 5 of the rack via a fluid connection passing through a longitudinal opening of the profile.

This fluid pipe 2, flexible, is accumulated on an accumulator such as a reel 20. This fluid pipe 2 forms a transmission which is configured to push or pull the truck for a nozzle-carrier rack in the guide profile 6. For this purpose, a pusher device 10, resting on the ground, includes at least one roller actuated by a motor M, the roller coming in rolling contact with the pipe. A tubular guide 12, upstream of the pusher device 10 and a tubular guide 12 downstream of the pusher device 10 are connected respectively to an inlet (for the flexible pipe) and an outlet (for the flexible pipe) of the pusher device 10 via connectors 11.

The tubular guide 12, upstream, ensures the guiding of the flexible pipe 2 between the accumulator 20 and the inlet (for the pipe) of the pusher device 10. The tubular guide 12, downstream, ensures the guiding of the flexible pipe 2 between the outlet of the pusher device 10, connected to an end of the tubular guide, downstream, and an open end of the guide profile 6, connected to the other end of the tubular guide 12.

Under the action of the motorized roller, the flexible pipe moves forward or backward in the guide profile 6 while ensuring the forward or backward movement of the truck for a nozzle-carrier rack 4 along the guide profile 6.

The weight of the truck and of the components that it supports exerts on the profile a force F which can cause the deflection of the guide profile, which requires providing, according to this prior art, a cross-section of the guide profile, particularly thick, in order to limit the deflection.

The present disclosure improves this situation.

Thus, the present disclosure relates to a device 1 for cleaning surfaces, mobile, in particular for the cleaning of the cooling elements of an exchanger, comprising:

a truck 3 for a nozzle-carrier rack, intended to be disposed in a movable manner facing the surface to be cleaned, carrying a nozzle-carrier rack 4, with one or more nozzles 5 spraying the surface to be cleaned, a guide system including, on the one hand, at least one guide profile 6; 6', 6" on which said truck 3 for a nozzle-carrier rack moves, acting as a path for said truck 3 during its movement in the direction of said guide profile, and on the other hand, bearing members 61, 62 of the truck moving on said at least one profile, for example such as rollers 61 internal to the profile and rollers 62 external to the profile, counter-bearing, a flexible pipe 2 for a cleaning fluid supplying said nozzle-carrier rack, motorization means and transmission means for actuating the truck for a nozzle-carrier rack to movement along the guide profile 6.

According to the present disclosure, said at least one guide profile 6; 6', 6" includes a rigidification device including at least one rigidification beam $7_1$, $7_2$; $7_3$, $7_4$ extending along said at least one guide profile, over the totality of the length of the guide profile 6, or at least over most of the length of the guide profile 6.

Figure 4:
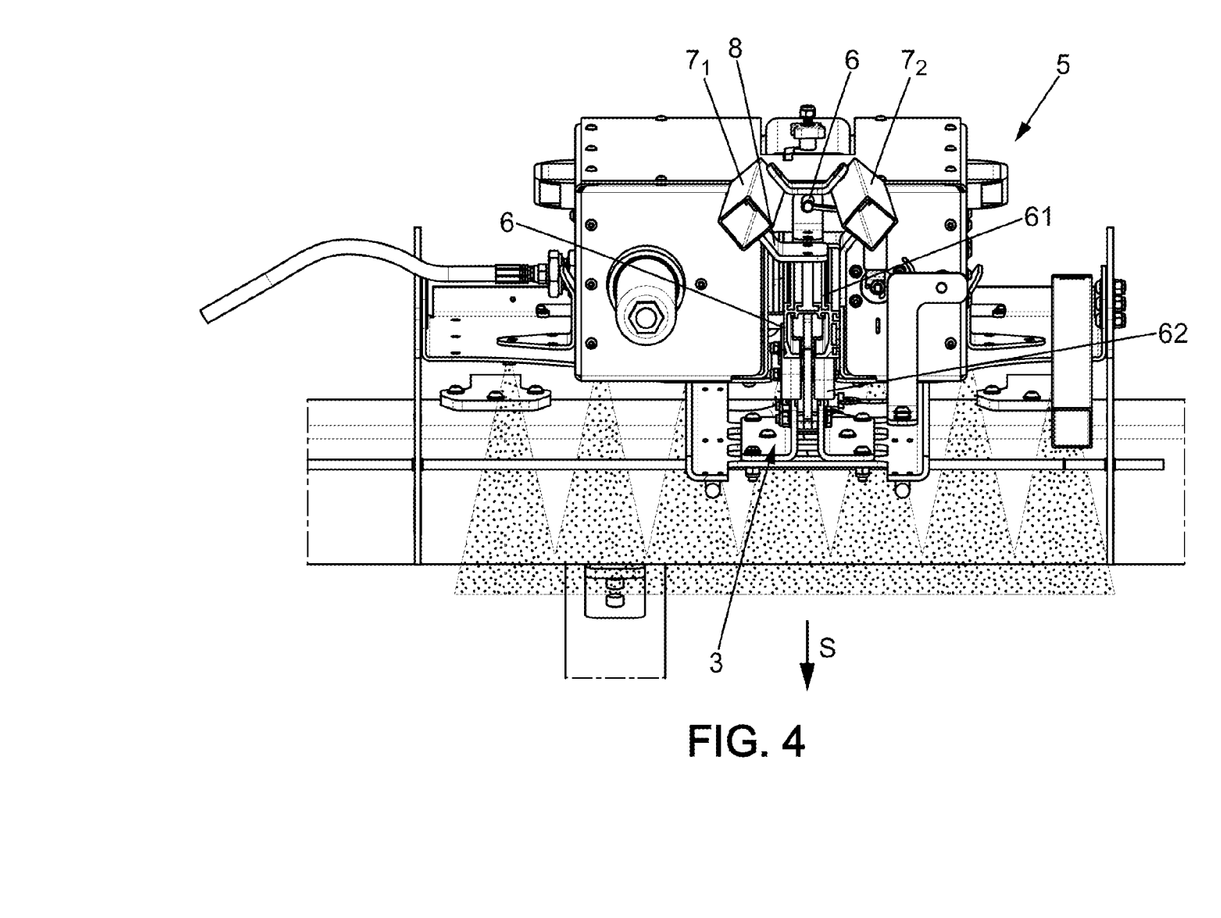
FIG. 4 is a cross-sectional view, illustrating the bearing members of the truck for a nozzle-carrier rack, including rollers, internal to the guide profile, and counter-bearing rollers, external to the guide profile, mounted on a support passing through the longitudinal opening of said guide profile.
Figure 5:
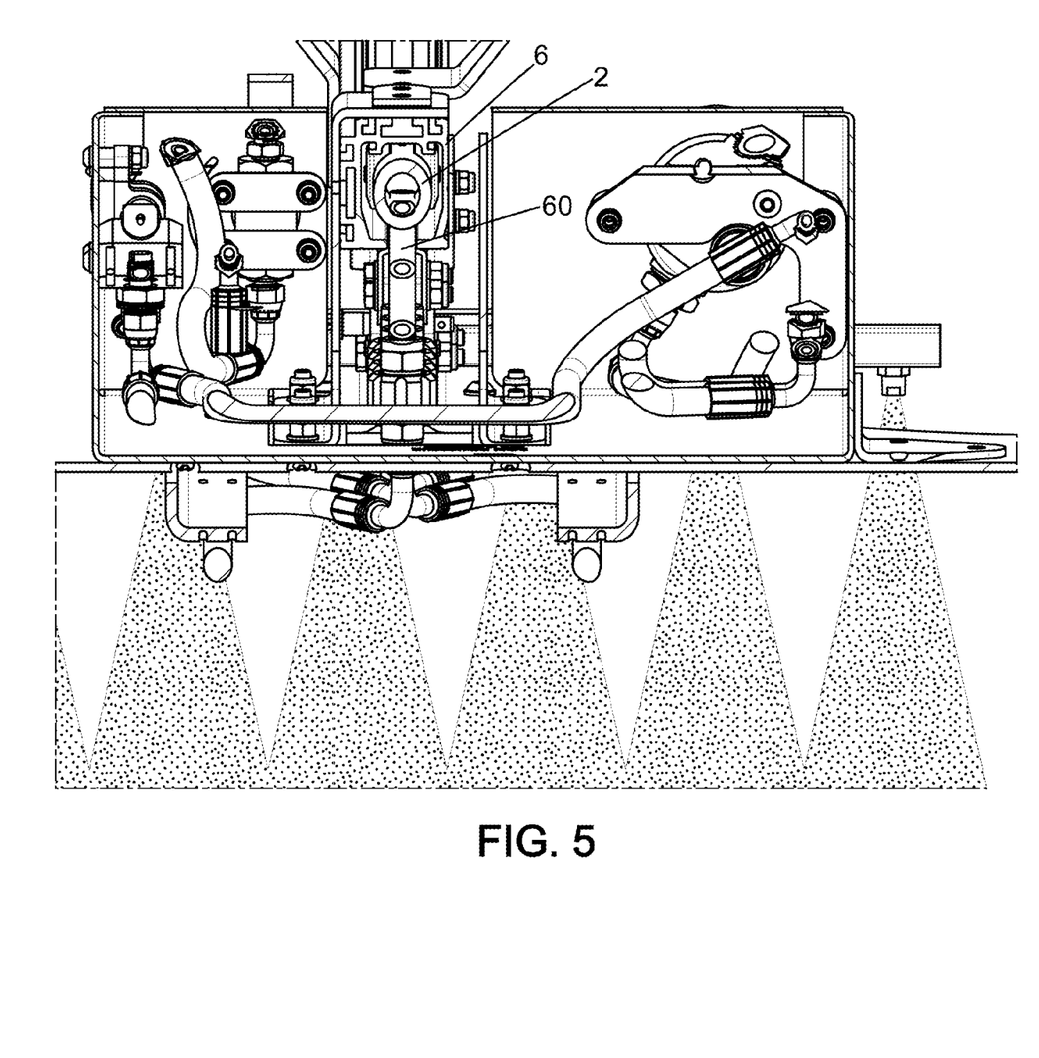
FIG. 5 is a cross-sectional view of the guide profile and of the truck for a nozzle-carrier rack, illustrating the flexible pipe, internal to the guide profile, movable to push or pull the truck, the flexible pipe supplying fluid to the nozzles of the nozzle-carrier rack via the longitudinal opening of the guide profile.
Figure 6:
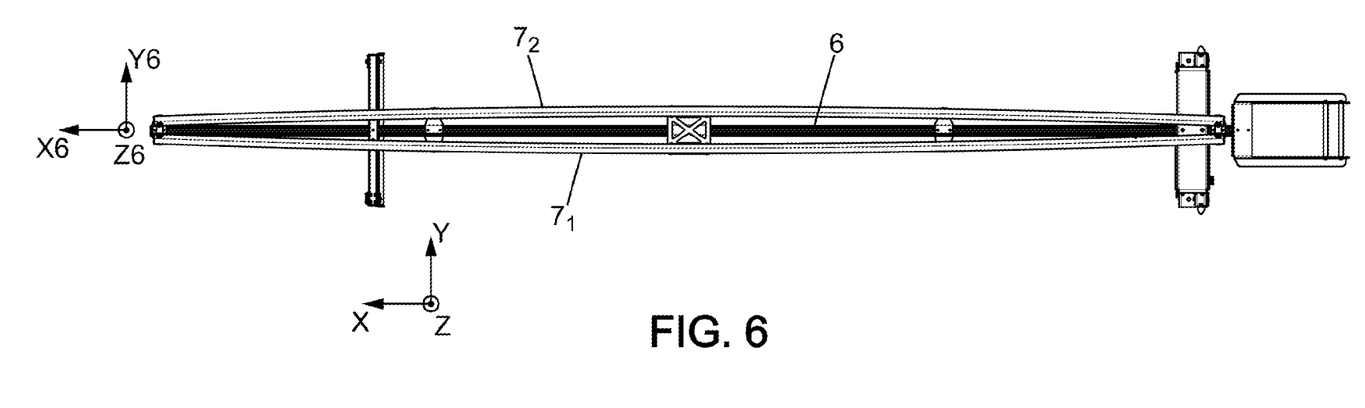
FIG. 6 is a top view of the guide profile with its two rigidification beams according to the first embodiment.
Figure 7:
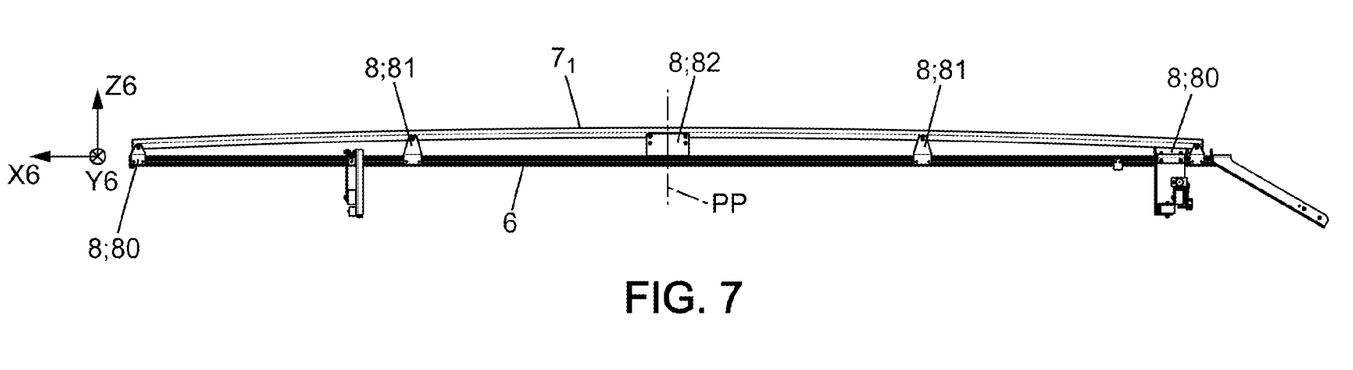
FIG. 7 is a side view of the guide profile with its two rigidification beams according to the first embodiment.

Said at least one rigidification beam $7_1$, $7_2$; $7_3$, $7_4$ is arranged above said guide profile 6; 6', 6" when the direction S of spraying of the nozzle(s) 5 is directed downward, as illustrated in FIG. 4 for example.

Said at least one rigidification beam $7_1$, $7_2$; $7_3$, $7_4$ is fastened to the guide profile in several discrete positions along the guide profile by fastening plates 8.

In particular, the fastening plates 8 can include:
end plates 80, connecting a first end of said at least one rigidification beam $7_1$, $7_2$; $7_3$, $7_4$ to a first end of said at least one guide profile 6 and connecting a second end of said at least one rigidification beam $7_1$, $7_2$; $7_3$, $7_4$ to a second end of said at least one guide profile 6,
one or more intermediate plates 81, 82, having a greater dimension than the end plates 80, the intermediate plates 81, 82 connecting said at least one rigidification beam $7_1$, $7_2$; $7_3$, $7_4$ to said at least one guide profile in one or more intermediate positions between the first ends and the second ends of the rigidification beam $7_1$, $7_2$; $7_3$, $7_4$ and of said at least one guide profile 6; 6', 6".

In particular, the fastening plates 8 can comprise several intermediate plates, including a central plate 82, arranged at mid-length of said at least one guide profile 6, and one or more intermediate plates 81 positioned between said central plate 82 and the end plates 80 preferably in a symmetrical manner with respect to a plane PP, perpendicular to the longitudinal axis of said at least one guide profile 6, the plane PP passing through said central plate 82. It is noted that the fastening plates have an increasing dimension, from the end plate 80 to the central plate 82 to accompany the curvature of said at least one rigidification beam, with a maximum spacing between the guide profile and said at least one rigidification beam at mid-length of the guide profile, at the central plate 82.

The fastening plates connect said at least one rigidification beam $7_1$, $7_2$; $7_3$, $7_4$ to the guide profile 6; 6', 6".

Again in a notable manner, said at least one rigidification beam $7_1$, $7_2$; $7_3$, $7_4$ is a metal beam that is maintained curved under tension in the elastic zone of the metal beam by said fastening plates 8.

In a notable manner, said at least one rigidification beam $7_1$, $7_2$; $7_3$, $7_4$ is advantageously configured so as to rigidify the guide profile 6. Rigidifying the guide profile 6 allows to limit the deflection of said guide profile 6 engendered by the load of the nozzle-carrier rack, when said truck moves along the guide profile 4.

It becomes possible to dimension the guide profile 6, 6; 6', 6" with a cross-section much smaller than that which would be necessary without the extra rigidification provided by said at least one rigidification beam, under elastic tension, limiting the weight/costs of the guide system, or at least limit the weight or the cost of the guide system in comparison to a guide system, the guide profile of which is rigidified by rigidification elements such as beams that are not placed under elastic tension.

The present disclosure also relates to a method for manufacturing the cleaning system, wherein the rigidification of the guide system including said at least one guide profile 6; 6', 6" is obtained by curving a rigidification beam $7_1$, $7_2$; $7_3$, $7_4$, metal, preferably rectilinear in the non-stressed state, and up to a radius of curvature of the beam in the elastic zone of said metal beam, then fastening of the rigidification beam under elastic tension at said radius of curvature to the guide profile 6 by the rigid connection of the fastening plates at said discrete positions along the guide profile 6; 6', 6".

According to a first embodiment, illustrated as an example in FIGS. 2 to 7, said at least one guide profile includes a single guide profile 6, and wherein said at least one rigidification beam includes a first rigidification beam $7_1$ and a second rigidification beam $7_2$ that are fastened to said guide profile 6 by said fastening plates 8 in said discrete positions, and curved in a symmetrical manner, in the elastic zone of the metal beams, with respect to a plane of symmetry X6Z6 passing through the axis of the guide profile 6.

In general, and in the present application, the reference frame XYZ is associated with said at least one guide profile 6, the axis X directed along the direction of the longitudinal axis of the guide profile 6, the axis Y perpendicular to X in a transverse direction, typically in a direction of the width of the nozzle-carrier rack, and the axis Z in the direction perpendicular to the plane XY, pointing towards the direction opposite to the direction S of spraying of the nozzle-carrier rack which is suspended below said at least one guide profile 6.

The reference frame X6Y6Z6 is associated in the same manner with said single guide profile 6, the axis X6 extending the same as the longitudinal axis of the guide profile 6, the axis Y6 perpendicular to X6 in a transverse direction, typically in a direction of the width of the nozzle-carrier rack 4, and the axis Z6 in the direction perpendicular to the plane X6Y6, pointing towards the direction opposite to the direction S of spraying of the nozzle-carrier rack which is suspended below said at least one guide profile 6.

When the surface to be cleaned Ech is a horizontal surface, the guide profile 6 is typically positioned horizontally, the plane XY (or X6Y6) thus parallel to the horizontal plane.

When the surface to be cleaned is a surface inclined by an angle A, the direction of the axis X (or X6) is directed according to the slope of the surface, inclined by the angle A with respect to the horizontal, the direction of the axis Y (or Y6) substantially horizontal, and the direction of the axis Z (or Z6) perpendicular to XY (or X6Y6).

According to this first embodiment, and as illustrated in FIGS. 2 to 7, the fastening plates 8 are in a V, each, or at least in part, having a fastening base 800, rigidly connected to the guide profile 6, in particular to an upper surface of the guide profile 6, as well as a first lateral wing 801 and a second lateral wing 802, extending on either side in a manner symmetrical to the plane of symmetry X6Z6, preferably lengthwise in a direction perpendicular to the direction X6, and in an inclined manner with respect to the plane of symmetry.

In general, all or a part of the fastening plates in a V can be made of one piece, namely the first and the second lateral wing form the same one-piece part. Some or even all or a part of the fastening plates (in particular the intermediate ones) can also be made of two distinct parts to form the two lateral wings with a possibility of adjusting their spacing.

Figure 3:
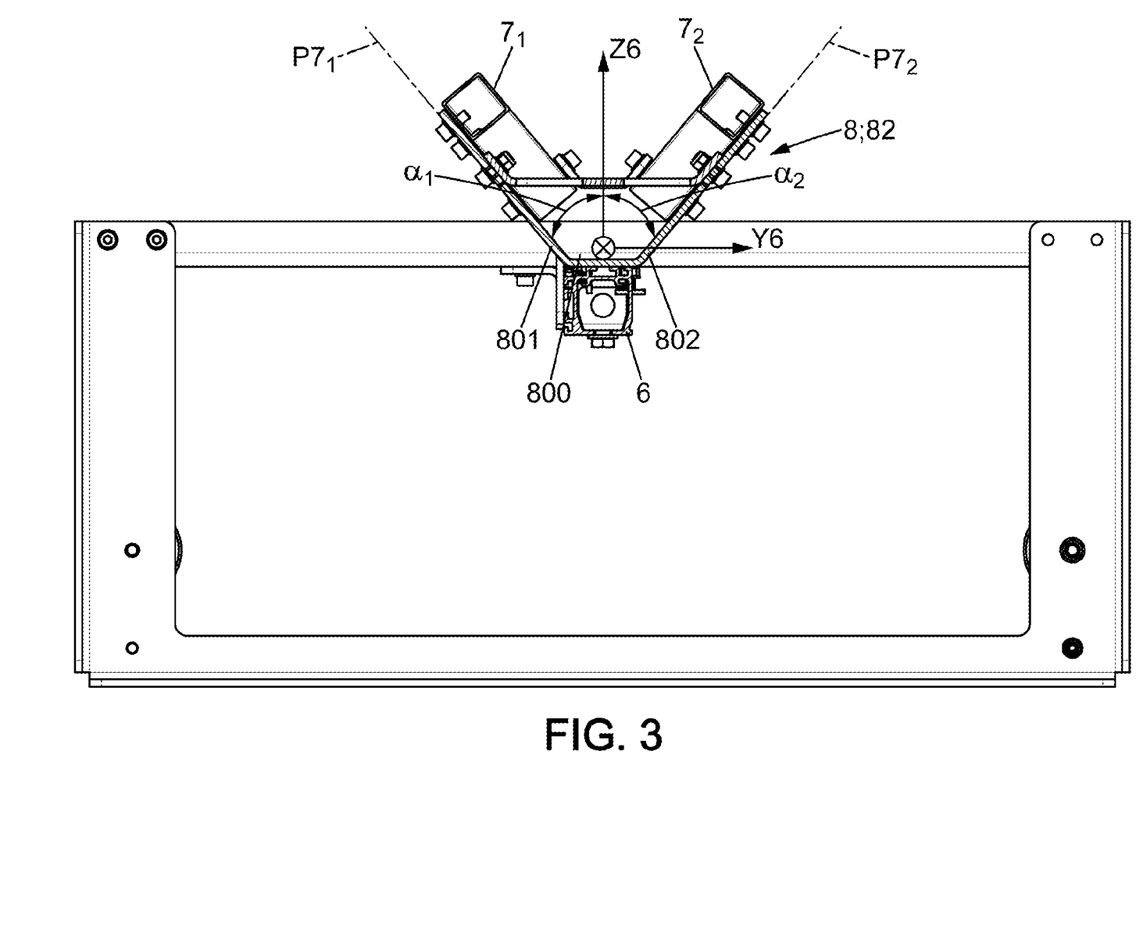
FIG. 3 is a view according to the cross-section of FIG. 2, illustrating more particularly the fastening plate, central in a V, as well as the two planes of curvature of the first and second rigidification beams defined respectively by the inclination of the lateral wings of the V.

As visible for example in FIG. 3, said first lateral wings 801 of the various fastening plates 8 are contained in the same first plane $P7_1$, ensuring the fastening of the first rigidification beam $7_1$ which is curved in a plane of curvature parallel to said first plane $P7_1$ and said second lateral wings 802 of the various fastening plates 8 are contained in the same second plane $P7_2$, ensuring the fastening of the second rigidification beam $7_2$ which is curved in a plane of curvature parallel to said second plane $P7_2$.

Plane of curvature means the fact that the rigidification beam is curved under tension in its elastic zone and according to a curved trajectory of the rigidification beam passing through the plane of curvature. The radius of curvature of the rigidification beam is centered with respect to a center contained in the plane of curvature.

The first inclination a1 between the first plane $P7_1$ and the plane of symmetry X6Z6 and the second inclination α2 between the second plane $P7_2$ and the plane of symmetry X6Z6 are identical in absolute value, typically between 10° and 80°, for example between 30° and 60° such as 45°.

Figure 8:
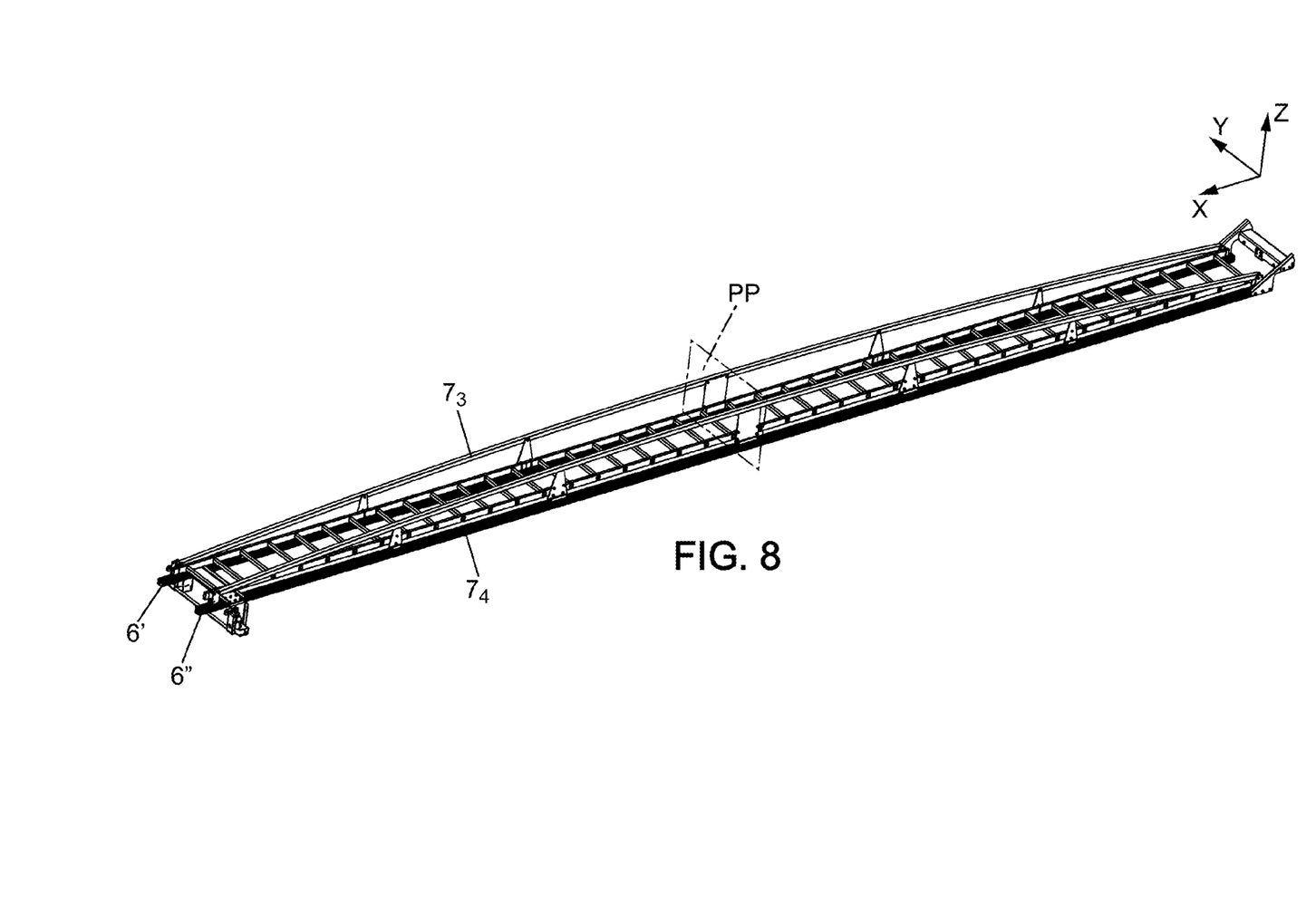
FIG. 8 is a perspective view of the guide system according to a second embodiment of the present disclosure, including two guide profiles (first and second), respectively associated with two rigidification beams (first and second) respectively by a first series and a second series of fastening plates, the fastening plates of the first series and the plates of the second series respectively fastened to two rails of a ladder with bars.
Figure 9:
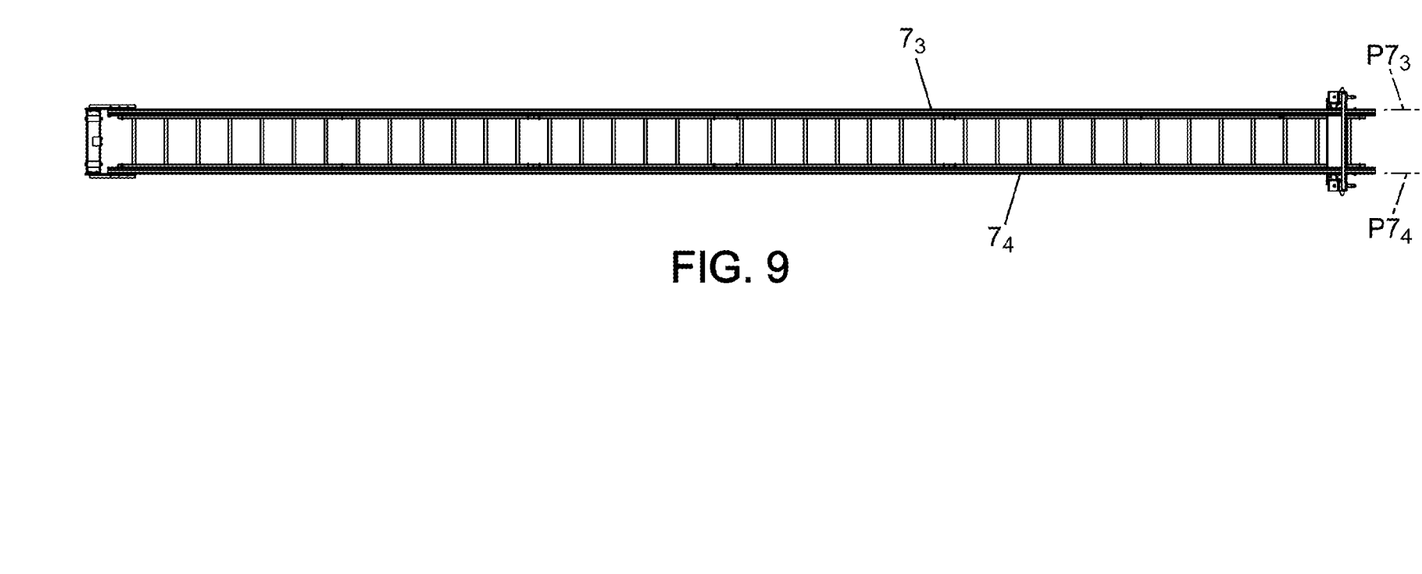
FIG. 9 is a top view of FIG. 8.
Figure 10:
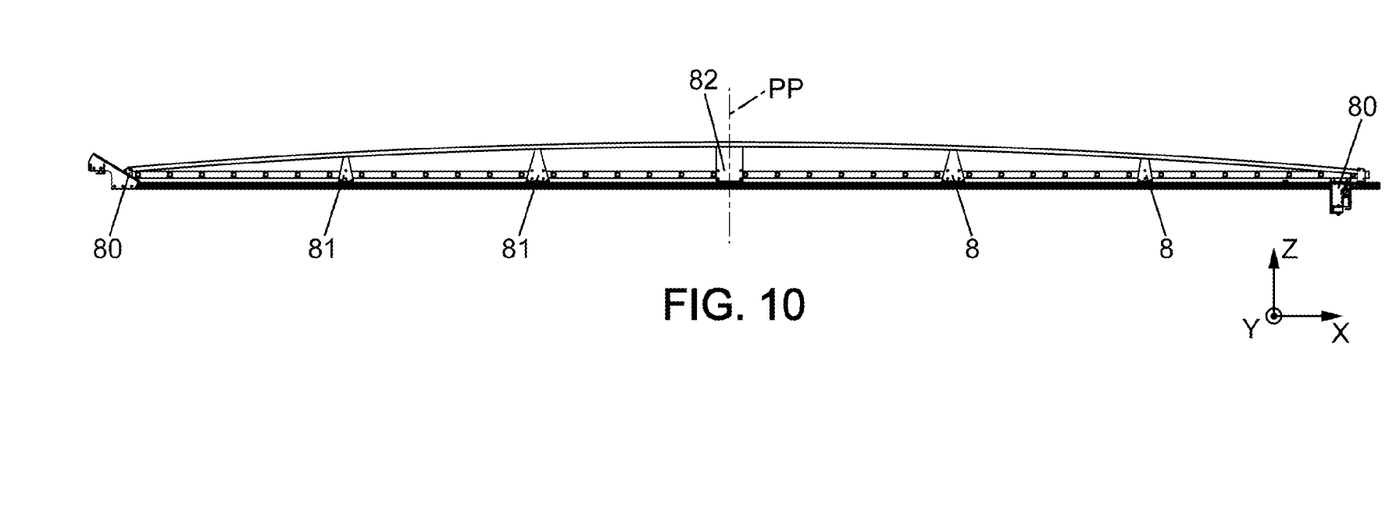
FIG. 10 is a side view of FIG. 8.
Figure 11:
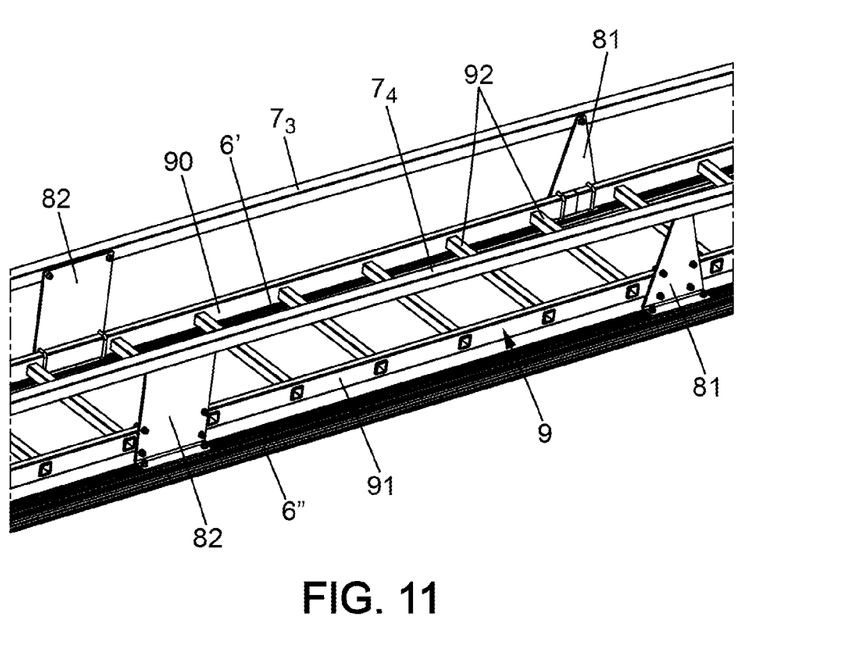
FIG. 11 is a detail view of FIG. 8.

According to a second embodiment, illustrated as an example, said at least one guide profile includes two guide profiles 6', 6", extending in parallel consisting of a first guide profile 6' and a second guide profile 6". According to this embodiment, the truck for a nozzle-carrier rack (not illustrated) includes first bearing members cooperating with the first guide profile 6', and second bearing members cooperating with the second guide profile 6".

According to this second embodiment, said at least one rigidification beam has a pair of rigidification beams, including:
- a first rigidification beam $7_3$ which is fastened by a first series of said fastening plates 8 to the first guide profile 6', curved in the elastic zone of the metal beam,
- a second rigidification beam $7_4$ which is fastened by a second series of said fastening plates 8 to the second guide profile 6', curved in the elastic zone of the metal beam.

A first set E1 consisting of the first guide profile 6', the first rigidification beam $7_3$ and the fastening plates of the first series, on the one hand, and a second set E2 consisting of the second guide profile 6", the second rigidification beam $7_4$ and the fastening plates 8 of the second series, on the other hand, are maintained in a parallel manner and are spaced apart by a ladder 9.

This ladder 9 includes a first rail 90 and a second rail 91, as well as bars 92 connecting the first rail 90 and the second rail 91 with regular spaces along the rails, first and second rail.

It is noted that the first guide profile 6' extends in parallel to the first rail 90 and near the latter and that the second guide profile 6" extends in parallel to the second rail 91 and near the latter. The fastening plates 8 of the first series are fastened to the first rail 90 and the fastening plates of the second series are fastened to the second rail 91.

Also and according to this second embodiment:
- the fastening plates 8 of the first series belonging to the first set E1 are contained in a plane $P7_3$ that is parallel to the plane of curvature of the first rigidification beam $7_3$, the first rail 90 and the first rigidification beam $7_3$ being fastened to said fastening plates of the first series on either side of said plane $P7_3$,
- the fastening plates 8 of the second series belonging to the second set E2 are contained in a plane $P7_4$ that is parallel to the plane of curvature of the second rigidification beam $7_4$, the second rail 91 and the second rigidification beam $7_4$ being fastened to said fastening plates of the second series on either side of the plane $P7_4$.

Thus and in FIG. 8, a reference frame XYZ is defined, the direction of the axis X is parallel to the first guide profile 6', to the second guide profile 6", as well as the first and second rail 90, 91, the direction of the axis Y parallel to the bars 92 of the ladder 9.

The fastening plates 8 of the first series are each fastened to the first guide profile 6', at their lower end, and extend as a protrusion upwards in the direction of the axis Z up to the first guide profile 6'. Each fastening plate 8 of the first series is fastened at its upper end to the first guide profile. The first rail 90 is fastened to the fastening plates of the first series, at an intermediate zone between the lower end and the upper end of the fastening plate 8.

Likewise, the fastening plates 8 of the second series are fastened to the first guide profile 6", at their lower end, and extend as a protrusion upwards in the direction of the axis Z up to the second guide profile 6". Each fastening plate 8 of the second series is fastened at its upper end to the second guide profile 6". The second rail 91 is fastened to the fastening plates 8 of the first series, at an intermediate zone between the lower end and the upper end of the fastening plate 8.

The truck for a nozzle-carrier rack is suspended from the first and second profile 6' and 6", below the ladder 9, and while the first and second rigidification beams extend above the ladder, on either side of the rails, in the direction Y.

According to one embodiment, said at least one rigidification beam is curved in its elastic zone with a radius of curvature between 10000 mm and 13000 mm, over the entire length of the beam, or at least most of the latter.

According to one embodiment:
- the flexible pipe 2 is provided as internal at least at said guide profile 6, capable of sliding in said guide profile 6 during the movement of said truck for a nozzle-carrier rack,
- said guide profile 6 has a longitudinal opening 60 facing said nozzle-carrier rack 4 allowing the circulation of the cleaning fluid from said flexible pipe 2, internal to said guide profile 6, to said nozzle-carrier rack,
- said transmission means consist substantially of said flexible pipe 2 which combines a function of pipe for a cleaning fluid and a function of transmission for the movement of said truck for a nozzle-carrier rack,
- said motorization means cooperate with said flexible pipe 2 to push or on the contrary to pull said flexible pipe in the guide profile 6, and thus move the truck 3 for a nozzle-carrier rack along said guide profile.

The motorization means and the transmission means can comprise the pusher device 10, in particular the tubular guides 12, upstream and/or downstream, and the connector 11, as well as the accumulator 20.

This can also be a conventional transmission, not using the flexible pipe as a transmission element, for example with a belt and as taught by EP-1 604 164.

In general, said at least one guide profile 6; 6', 6" can be itself mounted on rails oriented in the direction Y, and allowing the movement of the guide profile 6, 6', 6", in the transverse direction, in order to allow the jets of fluid to sweep the entire surface to be cleaned.

LIST OF THE REFERENCE SIGNS

1: Cleaning device,
2. Flexible pipe (for the cleaning fluid, typically water)
3. Truck,
4. Nozzle-carrier rack,
5. Nozzles,
6. Guide profile (single according to the first embodiment illustrated in FIGS. 1 to 7),
$7_1$, $7_2$. First and second rigidification beams (first embodiment),
$7_3$, $7_4$. First and second rigidification beams (second embodiment),
6', 6". First and second embodiment (according to the second embodiment illustrated in FIGS. 8 to 11;
60. Longitudinal opening
8. Fastening plates,
80. End plates
81. Intermediate plates
82. Central plate,
800. Base (fastening plate 8), 801. First wings (for the fastening of the first rigidification beam),
α1. First inclination (between the plane of the first lateral wings and the plane of symmetry X6Z6)
802 Second lateral wings (for the fastening of the second rigidification beam),
α2. Second inclination (between the plane of the second lateral wings and the plane of symmetry X6Z6)
$P7_1$ First plane of the first wings used to support the first rigidification beam,
$P7_2$. Second plane of the second wings used to support the second rigidification beam,
9. Ladder,
90,91. First rail and second rail,
92. Bars,
10. Pusher device,
11. Connectors
12. Tubular guides;
A. Angle of inclination
Ech. Surface to be cleaned (Exchanger),
PP. Plane of symmetry perpendicular to the guide profile with respect to which the fastening plates are symmetrical,
S. Direction of spraying
X6Z6. Plane of symmetry, passing through the guide profile with respect to which the first beam and the second beam are symmetrical.

The invention claimed is:

1. A mobile device for cleaning surfaces, comprising:
a truck for a nozzle-carrier rack disposed in a movable manner for facing a surface to be cleaned and carrying a nozzle-carrier rack with one or more nozzles for spraying the surface to be cleaned,
a guide system including at least one guide profile acting as a path on which said truck for a nozzle-carrier rack moves, and said truck having bearing members for moving on said at least one guide profile,
a flexible pipe for supplying a cleaning fluid to said nozzle-carrier rack,
a motorization element and a transmission element for actuating said truck for a nozzle-carrier rack to impart movement of the truck for a nozzle-carrier rack along said at least one guide profile,
wherein said at least one guide profile includes a rigidification device including at least one rigidification beam that extends along said at least one guide profile and above said at least one guide profile when the one or more nozzles are directed downward for spraying,
wherein said at least one rigidification beam is fastened to said at least one guide profile in several discrete positions along said at least one guide profile by fastening plates, said fastening plates connecting said at least one rigidification beam to said at least one guide profile, and
wherein said at least one rigidification beam is a metal beam having an elastic zone, which is maintained curved under elastic tension by said fastening plates, configured so as to rigidify said at least one guide profile.

2. The cleaning device according to claim 1, wherein the fastening plates include:
end plates connecting a first end of said at least one rigidification beam to a first end of said at least one guide profile and connecting a second end of said at least one rigidification beam to a second end of said at least one guide profile, and
one or more intermediate plates having a greater dimension than the first end and the second end of said at least one rigidification beam, the one or more intermediate plates connecting said at least one rigidification beam to said at least one guide profile in one or more intermediate positions between the first end and the second end of the rigidification beam and the first end and the second end of said at least one guide profile.

3. The cleaning device according to claim 2, having several intermediate plates, including a central plate arranged at mid-length of said at least one guide profile, wherein one or more intermediate plates are positioned between said central plate and the end plates, in a symmetrical manner with respect to a plane perpendicular to said at least one guide profile passing through said central plate.

4. The cleaning device according to claim 1, wherein:
said at least one guide profile includes a single guide profile, and
said at least one rigidification beam includes a first rigidification beam having an elastic zone that is under elastic tension, and a second rigidification beam having an elastic zone that is under elastic tension, said first rigidification beam and said second rigidification beam are each fastened to said single guide profile by said fastening plates in said discrete positions, and the elastic zones of said first rigidification beam and said second rigidification beam are curved in a symmetrical manner with respect to a plane of symmetry passing through the axis of said single guide profile.

5. The cleaning device according to claim 4, wherein:
the fastening plates are in a V, each, or at least in part, the fastening plates having a fastening base that is rigidly connected to said single guide profile and a first lateral wing and a second lateral wing that extend on either side in a manner symmetrical to the plane of symmetry and in an inclined manner with respect to the plane of symmetry,
said first lateral wings of the various fastening plates are contained in a first plane, ensuring the fastening of the first rigidification beam which is curved in a plane of curvature parallel to said first plane, and
said second lateral wings of the various fastening plates are contained in a second plane, ensuring the fastening of the second rigidification beam which is curved in a plane of curvature parallel to said second plane.

6. The cleaning device according to claim 5, wherein a first inclination between the first plane and the plane of symmetry and a second inclination between the second plane and the plane of symmetry are identical in terms of absolute value, between 10° and 80°.

7. The cleaning device according to claim 6, wherein the first inclination and the second inclination are between 30° and 60°.

8. The cleaning device according to claim 1, wherein:
said at least one guide profile includes two guide profiles, extending in parallel, consisting of a first guide profile and a second guide profile,
said at least one rigidification beam has a pair of rigidification beams including:
a first rigidification beam that has an elastic zone, which is under elastic tension, and is fastened by a first series of said fastening plates to the first guide profile and curved in the elastic zone, and
a second rigidification beam that has an elastic zone, which is under elastic tension, and is fastened by a second series of said fastening plates to the second guide profile and curved in the elastic zone, and a first set consists of the first guide profile, the first rigidification beam and the fastening plates of the first series, and a second set consists of the second guide profile, the second rigidification beam and the fastening plates of the second series, wherein the first set and second set are maintained in a parallel manner and are spaced apart by a ladder including a first rail, a second rail, and bars connecting the first rail and the second rail, and wherein the fastening plates of the first series are fastened to the first rail and the fastening plates of the second series are fastened to the second rail.

9. The cleaning device according to claim 8, wherein:
the fastening plates of the first series belonging to the first set are contained in a plane that is parallel to the plane of curvature of the first rigidification beam,
the first rail and the first rigidification beam being fastened to said fastening plates of the first series on either side of the plane,
the fastening plates of the second series belonging to the second set are contained in a plane that is parallel to the plane of curvature of the first rigidification beam, and
the second rail and the second rigidification beam being fastened to said fastening plates of the second series on either side of the plane.

10. The cleaning device according to claim 1, wherein said at least one rigidification beam is curved in its elastic zone with a radius of curvature between 10000 mm and 13000 mm.

11. The cleaning device according to claim 1, wherein:
the flexible pipe is provided internally of said at least one guide profile and is capable of sliding into said at least one guide profile during the movement of said truck for a nozzle-carrier rack,
said at least one guide profile has a longitudinal opening facing said nozzle-carrier rack allowing circulation of the cleaning fluid from said flexible pipe, internal to said at least one guide profile, to said nozzle-carrier rack,
said transmission element consisting substantially of said flexible pipe which combines a function of pipe for a cleaning fluid and a function of transmission for movement of said truck for a nozzle-carrier rack, and
said motorization element cooperating with said flexible pipe to push or pull said flexible pipe in said at least one guide profile to move the truck for a nozzle-carrier rack along said at least one guide profile.

12. A method for manufacturing a cleaning device according to claim 1, wherein the rigidification of the guide system including said at least one guide profile is obtained by curving a rigidification beam up to a radius of curvature of the rigidification beam in the elastic zone, then fastening of the rigidification beam under elastic tension at said radius of curvature to said at least one guide profile by a rigid connection of the fastening plates at said discrete positions along said at least one guide profile.

\* \* \* \* \*